United States Patent [19]
Gent

[11] 3,975,169
[45] Aug. 17, 1976

[54] PROCESS FOR PRODUCING A NATURAL GAS SUBSTITUTE
[75] Inventor: Colin William Gent, Stockton-on-Tees, England
[73] Assignee: Imperial Chemical Industries Limited, London, England
[22] Filed: Dec. 16, 1974
[21] Appl. No.: 533,175

Related U.S. Application Data
[63] Continuation of Ser. No. 325,733, Jan. 22, 1973, abandoned.

[30] Foreign Application Priority Data
Jan. 26, 1972 United Kingdom............... 3685/72

[52] U.S. Cl. .......................... 48/214 A; 48/197 R; 260/449 M
[51] Int. Cl.² ........................................ C10G 11/28
[58] Field of Search ..................... 48/197 R, 214; 260/449 M

[56] References Cited
UNITED STATES PATENTS

| | | | |
|---|---|---|---|
| 3,420,642 | 1/1969 | Percival | 48/214 |
| 3,511,624 | 5/1970 | Humphries et al. | 48/197 |
| 3,531,267 | 9/1970 | Gould | 48/214 |
| 3,625,665 | 12/1971 | Thompson | 48/214 |
| 3,642,460 | 2/1972 | Thompson | 48/214 |
| 3,709,669 | 1/1973 | Marion et al. | 48/214 X |
| 3,743,488 | 7/1973 | Bogart | 48/214 |

FOREIGN PATENTS OR APPLICATIONS

| | | | |
|---|---|---|---|
| 1,102,801 | 2/1968 | United Kingdom | |
| 1,032,753 | 6/1966 | United Kingdom | |
| 1,227,156 | 4/1971 | United Kingdom | 48/214 |

Primary Examiner—Robert L. Lindsay, Jr.
Assistant Examiner—Peter F. Kratz
Attorney, Agent, or Firm—Cushman, Darby & Cushman

[57] ABSTRACT

Methane is produced by reacting a feed gas containing carbon oxides and hydrogen catalytically at an outlet temperature in the range 250–450°C in heat exchange with boiling water generating steam at high pressure or in co-current heat exchange with coal feed gas, whereby heat is continuously removed from the process. By operating such a process in conjunction with a process of reacting hydrocarbons of higher molecular weight than methane with steam a natural gas substitute can be produced very economically.

15 Claims, No Drawings

PROCESS FOR PRODUCING A NATURAL GAS SUBSTITUTE

This is a continuation of application Ser. No. 325,733 filed Jan. 22, 1973 and now abandoned.

This invention relates to a process for making a natural gas substitute. Processes so far proposed for making natural gas substitutes have usually involved a stage of reacting a carbonaceous feedstock with steam to form a gas containing carbon oxides, hydrogen and a substantial proportion of methane, and one or more succeeding stages in which the carbon oxides are reacted with the hydrogen in that gas to form further methane. In order to produce a substantial proportion of methane in the first-mentioned stage, the outlet temperature of that stage is usually less than 600°C; and it is considered undesirable to produce less methane because of the problems involved in controlling the succeeding stages, which must evolve more heat per unit volume of reactants the greater the proportion of hydrogen and carbon oxides in the reactants. The low temperature and relatively low heat evolution in prior processes have the unwanted result that relatively little heat can be recovered by means of waste-heat boilers, so that the process is not self-sufficient in power and has had to be supported by an external boiler or by imported electric power or both.

We have now devised new ways of carrying out the succeeding methane-forming operations, and new over-all processes having a more favourable heat balance as a result.

According to a first aspect of the invention a process for producing methane comprises reacting a feed gas containing carbon oxides and hydrogen catalytically at an outlet temperature in the range 250°–450°C in heat exchange with boiling water generating steam at a pressure of at least 500 psig. (35 ata), or in co-current heat exchange with cool feed gas, whereby heat is continuously removed from the process.

The temperature 250°C corresponds to saturated steam at a pressure of 560 psig. (39 ata). At 300°C the pressure of saturated steam is 1232 psig (85 ata). Steam at pressures up to 3194 psig. (218 ata, at 374°C, the critical temperature) could in principle be generated, but this is not usually necessary and is undesirable since the latent heat of evaporation of water, as the critical temperature is approached, becomes too small to afford efficient cooling. The pressure is therefore controlled by varying the rate of feed of water to the steam side of the reactor. The practical pressure upper limit is about 2000 psig. (137 ata.) since steam in the range 1000-2000 psig (68-137 ata) is suitable for letting down through pass-out turbines driving machines required in conjunction with the production of methane, the pressure of the passed-out steam from the turbines being suitable for use in such processes.

Processes according to the boiling water method of the invention are suitably carried out in a reaction vessel in which the catalyst is disposed in one or more tubes surrounded by the boiling water under pressure. The tubes are suitably of an internal diameter in the range 10 to 150 mm, especially 20 to 75 mm. As an alternative the catalyst may be in a space surrounding one or more tubes containing boiling water under pressure, as in a water-tube boiler, but this is less convenient owing to the greater difficulty of fabrication and of providing for changes of catalyst. For the best temperature control the tubes are parallel and uniformly spaced.

The process using co-current heat exchange is suitably carried out in a reactor in which the catalyst is disposed in one or more tubes or in a space surrounding one or more tubes. The tube internal diameter is suitably in the range 5 to 100 mm, especially 10 to 60 mm, and they preferably are parallel and uniformly spaced. Since heat is withdrawn from the catalyst bed as sensible heat of the incoming reactants, the reactants are if necessary cooled before entering the catalyst bed. After leaving the catalyst bed the reacted gases must be cooled before drying and delivery to customers. These cooling steps afford valuable heat recoveries.

By the employment of cooling by pressurized boiling water or by co-current unreacted gas it is ensured that a large cooling effect is availble at the inlet of the catalyst bed, at which the content of reactable gases and hence the heat-output and risk of over heating, are greatest.

The temperature of the processes of the first aspect of the invention is preferably in the range 300°–400°C, as measured at the reactor outlet. Since the cooling procedures remove heat as it is generated, the reactors can be substantially isothermal.

The processes of the first aspect of the invention are applicable to a wide variety of gas mixtures containing carbon oxides and hydrogen, for example water gases produced from solid fuels, shifted water gases, gases produced by hydrocarbon partial oxidation and gases produced by hydrocarbon steam reforming at high or low temperatures. They can be used in conjunction with further stages of methanation upstream or downstream and with other methods of temperature control such as quench-cooling or recycling of cold product gas or can be used both in the same plant; but they are especially suitable as the sole methanation stage in processes for producing natural gas substitutes. In this way they make possible a combination process in which a gas of moderate methane content and considerable hydrogen content, such as one of calorific value 400–600 B.ThU/ft$^3$, is produced by hydrocarbon/steam reaction and then subjected to substantially complete methanation in one stage.

Since the processes of the first aspect of the invention provide for effective removal of heat, they are preferably operated with a relatively low inlet concentration of steam or carbon dioxide. Steam is effective as a heat-absorbing diluent and in limiting the extent of the methanation reaction; but the processes are preferably operated with feed gases containing less than 40%, preferably less than 15% and down to the lowest economically practicable level of steam, suitably in the range 0.3 to 4.0% by volume. As a result the outlet temperature can be as high as 450°C with substantial conversion to methane, instead of about 300°C in processes previously proposed.

Carbon dioxide is also effective as a heat-absorbing diluent gas and reaction limiter. Its concentration, however, is preferably only sufficient to form methane with hydrogen in excess of what can be reacted with carbon monoxide.

A typical content of carbon dioxide in the feed gas is in the range 2 to 6%. Normally there is enough carbon oxide to react with all the hydrogen. Then at these low levels of temperature-controlling gases the boiling water process should be used when the hydrogen content of the feed gas is over 25% and is preferably used when the hydrogen content is over 15% in order to afford a margin of safety in the event of gas composition fluctuations. At the same level of temperature-controlling gas the co-current cooling method can be used when the hydrogen content is up to 25%, but is preferably not used when the hydrogen content is over 20%, in order to afford the margin of safety. The co-current process is desirable, for safety reasons, when the hydrogen content is over 8%. It will be appreciated that the hydrogen content may be taken as a measure of the heat evolution because in making methane it undergoes a high extent of reaction with carbon oxide. Higher proportions of hydrogen are of course permissible if the reactant gas contains steam and hydrocarbons higher than methane, since these react together to give initially carbon oxides and hydrogen, an endothermic reaction.

These hydrogen contents apply particularly to the pressure range 400 to 1000 psig (28-68 ata), but are subject to only slight variation outside that range, since methane formation is almost complete. It will be appreciated that at lower pressures or higher steam or carbon dioxide contents operation at higher hydrogen content is practicable.

The pressure for the process is typically in the range 40-80 ata.

The catalysts for the first-mentioned aspect of the invention suitably include Group VIII metals on refractory supports, for example nickel or cobalt, optionally with a platinum group metal, or platinum group metals alone, the support comprising for example magnesia, alumina, silica, titania, zirconia, thoria or chromia, mixtures or compounds of more than one of these and hydraulic cements. The catalyst can be of the compounded type, for example, co-precipitated nickel-alumina or nickel-alumina-cement, or of the impregnated type. Usually the active metal content is relatively high, for example 15-85% of nickel (calculated as NiO) in compounded catalysts, in order to afford high activity. The catalyst at the inlet portion of the bed can be of lower activity so as to control the reaction rate where the reactants concentration is highest.

According to the first combination process of the invention a natural gas substitute is produced at least partly from a hydrocarbon feedstock of higher molecular weight than methane by a first stage in which a hydrocarbon feedstock that is methane or is partly or wholly of a higher molecular weight than methane, is reacted with steam to give a first gas containing carbon oxides and hydrogen; a second stage in which the product of the first stage, steam, (residual and/or added) and hydrocarbon feedstock of higher molecular weight than methane are reacted together over a catalyst having steam reforming and methanation activity to give a second gas; and a third stage in which carbon oxides and hydrogen in the second gas are reacted together according to the first aspect of the invention.

The methane content of the first gas is preferably less than 30% by volume on a dry basis, more preferably under 12%, since lower methane content corresponds to a greater content of carbon oxides and hydrogen and hence a greater quantity of chemical heat which can be liberated in the second stage by exothermic methanation and used in endothermic reaction of feedstock with steam. The methane content of the second gas is preferably greater than that of the first gas and is suitably in the range 20-40%. The methane content of the gas produced in the third stage is preferably at least 90% by volume on a dry basis, after removal of carbon dioxide. The hydrogen content of the second gas is as specified for the first-mentioned aspect of the invention.

The second stage is suitably at an outlet temperature of 600°-700°C. The feed to the second stage is a mixture of crude first gas and feedstock hydrocarbon (preferably newly added, but some may be present as the result of incomplete reaction in the first stage), with possibly steam extra to what is already present in the first-stage gas. The inlet temperature is lower than the outlet temperature typically by up to 100°C. Whatever its temperature, the second stage should be operated so as to give a ratio of hydrogen to carbon monoxide not less than is stoichiometrically required to form methane with substantially all the carbon monoxide. Removal of excess hydrogen is substantially completed in the third stage by reaction with carbon dioxide.

The feedstock fed to the second stage is preferably over 50, especially 75–90% by carbon atoms of the total feedstock. In calculating this proportion, product methane recycled to the first stage is counted as feedstock. Suitable conditions for the second stage are described in our Specifications 1032753 and 1102801.

The second stage steam ratio is not normally specified for design purposes and therefore need not be cited as a characterising feature of the invention. However the ratio of total steam fed to the first and second stages to total hydrocarbon feedstock fed is suitably in the range 1.3 to 4.0, preferably 1.4 to 2.0.

The third stage affords a greater conversion of carbon oxides and hydrogen to methane if operated after the bulk of the steam and carbon dioxide have been removed. The steam content of the gas is preferably in the range 0 to 15% v/v, preferably as low as is economically practicable. The carbon dioxide content is preferably in the range 2 to 5% v/v. Hydrogen preferably reacts with carbon oxides during the third stage to an extent such that no further carbon dioxide removal treatment is needed. The gas needs a drying treatment, however, similar to that used in existing processes.

In an important form of the process of the invention the third stage is operated at a substantially higher pressure than the first and second stage. This has several advantages. For example, the first and second stages can be operated at pressures under 40 atm., such that no new reformer and reactor technology is required. Secondly, in the third stage the higher pressure favours the formation of methane; thus the removal of steam from the gas need be less thorough and the methanation outlet temperature can be allowed to rise slightly higher. Thirdly, when carbon dioxide is removed from the second-stage gas after compression, the volume of the removal plant and subsequent methanation and drying stages is considerably smaller; and the extent of cooling required in order suitably to dry that gas is also less.

Conveniently the gas is compressed after the second stage at a level equal to the sum of the required final product gas pressure and the pressure-drop through the vesels following the compressor. A suitable level is about 1200 psig (83 ata) when the product gas delivery pressure is to be 1000 psig. (68 ata).

According to a second combination process according to the invention a natural gas substitute is produced at least partly from a hydrocarbon feedstock of higher molecular weight than methane by a first stage similar to that of the first combination process;

a second stage in which the product of the first stage, steam (residual and/or added) and hydrocarbon feedstock of higher molecular weight than methane are reacted together over a catalyst having steam reforming and methanation activity in a process according to the first aspect of the invention to give a gas of high methane content; especially over 90%; and an optional third stage in which the gas of high methane content is methanated further, this third state being employed if a higher proportion of methane is requied than can be conveniently produced in the second stage.

The methane content of the first gas of the second combination process is preferably less than 12%, more preferably less than 8%. Although the hydrogen content of such a gas is correspondingly high, the gas can be methanated in either form of the process of the first aspect of the invention since the strongly exothermic heat of methanation is evolved in the presence of the concurrent steam/naphtha reaction, which is only mildly exothermic. Nevertheless, the boiling water reactor is preferred for the sake of simplicity in design.

The outlet temperature of the second stage of the second combination process is, according to the first aspect of the invention, in the range 250°–450°C. Preferably the rate of water feed to the reactor is adjusted so that the temperature is less at the outlet than at the inlet by between 20° and 100°C.

The feedstock fed to the second stage is by carbon atoms preferably over 70% of the total hydrocarbon fed to the process, especially between 75 and 95%. The ratio of total steam fed to the first and second stages to total hydrocarbon feedstock fed is suitably in the range 1.0 to 4.0, especially 1.2 to 2.0. For calculating these proportions, recycled methane is counted as feedstock.

If a final methanation stage is employed, this can be done before or after compression and/or carbon dioxide removal.

The first stage of either combination process is suitably a tubular steam reforming stage at an outlet temperature in the range 600–900°C, for example such as is used for making coal-gas replacements in a single stage (600°–700°C), or for making lean town gas (700°–800°C) or crude synthesis gas (750°C and above). The pressure is suitably in the range 5–40 ata and the steam ratio 1.5 to 6.0 molecules of steam per atom of carbon in the feedstock. Processes of these kinds are described in our UK specifications 953877 and 1032751. Other processes which can be used involve a preliminary reaction of feedstock with steam at under 600°C, either in an inlet zone of the tubular stage or in a separate vessel preceding an endothermal stage. Preferably the heat input for the first stage is entirely by indirect heat exchange, as in an ordinary steam reforming process, since direct heating (partial oxidation with or without a catalyst) requires a supply of oxygen and is therefore more expensive, if nitrogen-free gas is required.

Each stage may be carried out in two or more substages if desired.

The catalyst for the first stage is suitably a Group VIII metal on a refractory support. Its composition can be similar to that of the catalyst for the first-mentioned aspect of the invention, but it should be formulated to withstand the higher temperatures involved. If the feedstock for the first or second stage is one which readily forms by-product carbon, the catalyst is preferably of the selective type as described in the above-mentioned UK specifications.

The hydrocarbon feedstock of higher molecular weight than methane may be a gaseous paraffin, for example, ethane, propane or a butane or a corresponding olefin or mixtures thereof or a petrochemical off-gas containing gaseous hydrocarbons and possibly hydrogen. More conveniently it is a normally liquid hydrocarbon, since these can be stored without cooled vessels or pressure vessels. Suitable normally liquid hydrocarbons include naphthas boiling at up to 350°C, especially up to 220°C. Preferably these are straight-run distillates.

The feedstock is conveniently the same in each of the stages in which it is used. It is however within the invention to use natural gas or other methane-rich gas or substitute natural gas for the first stage and/or to use methanol as part or all of the feedstock for either stage, either as regular or peak load feedstock. Hence the term "hydrocarbon feedstock" includes methanol. The feedstock for the first stage can be methane recycled from a product stream or other methane-rich stream of the same combination process.

The hydrocarbon usually requires desulphurisation before it can be fed to the catalytic stages. This is effected by reaction of its vapour with hydrogen at e.g. 300°–450°C over a hydro-desulphurisation catalyst, such as a supported platinum group metal or molybdenum oxide with cobalt oxide or nickel oxide or both, followed by absorption of the hydrogen sulphide formed. A suitable process is described in our specification 902148. The first gas is suitable as a source of hydrogen for this hydrogenation, hence a part-stream of the crude gas is diverted, cooled in a waste-heat boiler or other heat recovery means, optionally shifted, freed of excess steam by condensation and fed to the desulphurisation section. In order to keep the volume of this part-stream to an economic level, its methane content (dry basis) is preferably not over 10%. Carbon oxides can be wholly or partly removed from it, for example by copper liquor or alkali carbonate or amine solutions, in order to avoid an excessive amount of the side reaction of methanation over the desulphurisation catalyst. Alternatively the carbon oxides removal stage can be omitted and a catalyst of low methanation activity, such as nickel molybdate, used for hydro-desulphurisation.

After the third stage of either combination process the calorific value of the gas may be adjusted by addition of "liquefied petroleum gas" or by stripping gaseous hydrocarbons from a normally liquid hydrocarbon.

The heat-recoveries effected during the combination processes are preferably such as to make operation substantially independent of imported power of any kind and of steam other than that recovered from cooling steps. It is particularly important to minimise the use of imported electricity if the substitute natural gas is required chiefly at periods of peak power demand, since then the price of electricity is high and a continuous supply may be uncertain. The principal high-grade heat recoveries are a. from the flue gases of the furnace of the first stage, if this stage is externally heated;

b. from the part-stream of first-stage gas passed to the desulphurisation section including, if a shift stage is used, recoveries before and after shift;

c. from the gas leaving the second stage of the first combination process;
d. from the catalyst bed of the third stage of the first combination or the second stage of the second if cooling is by boiling water or from the gas entering or leaving such a stage, if co-current cooling is used.

Each of these is suitably effected by a boiler producing steam at a pressure equal to the sum of the process steam inlet pressure, the allowances for heat and pressure losses and the pressure-difference of the expansion engines operating feed-pumps, compressors and circulators and other machines. These engines are preferably mainly pass-out turbines exhausting into the process. The pressure of the steam generated is preferably over 1000 psig. (68 ata) since then the engines can be relatively small and inexpensive. The gas leaving such waste-heat boilers still contains substantial quantities of low grade heat.

The principal low-grade heat recoveries are
a. from the flue gases of the first stage, following high-grade heat recovery;
f. from the stream of first-stage gas passed to the desulphurisation section, following high-grade heat recovery;
g. from the gas leaving the second stage of the first combination process, following high-grade heat recovery;
h. following compression if this is used;
i. from the effluent of the feed-effluent preheater of the third stage of the first combination or the second stage of the second combination if cooling is by boiling water, or following the waste-heat boiler if co-current cooling is used.

Of these, (g) can produce steam at 25 psig (2.7 ata) suitable for use in regenerating the absorbent liquor of the carbon dioxide removal section. Recovery (f) however can conveniently produce only very low grade steam (e.g. 15 psig. 2 ata) since the pressure of the first gas is not high and it must be cooled to a temperature low enough to condense its content of unreacted steam; the removal of steam is necessary if the hydrogen sulphide absorption materials (e.g. ZnO, $Fe_2O_3$) of the desulphurisation section are to be fully effective. Therefore it is preferred that recovery (f) should be by direct contact with water-insoluble liquid hydrocarbon feedstock, followed by separation of the feedstock from the water formed by condensation and feeding of the warmed hydrocarbon to the process.

The preferred featurs of methanation after carbon dioxide removal, enrichment of product gas by stripping gaseous hydrocarbons with liquid feedstock, and cooling of recycle gas by direct contact with feedstock are the subject of our co-pending U.S. Application Ser. No. 325,734 filed Jan. 22, 1973 and now abandoned.

EXAMPLE 1 (calculated)

First combination process

In the first stage 140 metric tons per hour of desulphurised naphtha (boiling range 30°–220°C) are reformed with steam (ratio 3.0) in an externally heated tubular catalyst bed of refractory alkalised nickel catalyst at pressure 450 psig (31.6 ata), outlet temperature 800°C. From the flue gases of the furnace steam is produced at 1500 psig (103 ata) in a waste heat boiler. The hydrogen-containing product gas ("first gas" - see Table 1 below) is partly (stream A) cooled in a waste heat boiler (42 metric tons of steam per hour at 1500 psig), then freed of steam by contact with liquid naphtha, which it warms from 15°C to 180°C. The warm naphtha and the water formed by condensation of the steam are separated. The naphtha is vaporised and passed with the steam-free gas stream A over zinc oxide, then nickel molybdate catalyst, then more zinc oxide and used partly as the feed to the reforming stage just described, partly for the second stage.

In the second stage the remainder of the first gas (stream B) is fed unchanged to an insulated reactor containing supported nickel reforming/methanation catalyst after injecting the rest of the desulphurised naphtha (293 metric tons per hour) and further steam into it. The outlet temperature of the second stage was 650°C and the composition of the "second gas" is as shown in the Table.

In the third stage the second gas is cooled in a waste heat boiler (1150 metric tons of steam per hour at 1500 psig), cooled further in the regenerator of the subsequent carbon dioxide removal section, whereby steam is substantially condensed, then compressed to 1000 psig (68 ata) and subjected to carbon dioxide removal (down to 5.3%) by means of a potassium carbonate/diethanolamine solution. The resulting gas is heated by a feed/effluent preheater and passed over a methanation catalyst in the tubes of a boiling water reactor at inlet temperature 250°C, outlet temperature 325°C (steam output 805 metric tons per hour at 1500 psig). The final product gas is dried and, as the composition in the Table shows, is a natural gas substitute.

TABLE 1

| | Gas compositions | | | |
|---|---|---|---|---|
| | CO | $CO_2$ | $H_2$ | $CH_4$ |
| First (apart from steam) | 12.35 | 15.06 | 61.21 | 11.38 |
| Second (apart from steam) | 6.04 | 19.40 | 38.90 | 35.66 |
| Final product | 0.03 | 0.5 | 1.45 | 98.02 |

In this process the steam at 1500 psig is let down through pass-out turbines exhausting at 600 psig (42 ata). The exhaust steam is fed to the first and second stages and the power used to drive the compressor and various pumps.

EXAMPLE 2 (also calculated)

Second combination process

In the first stage 1000 kg. mole per hour of desulphurised naphtha (boiling range 30°–220°C) are reformed with steam (ratio 3.0) in an externally heated bed of refractory alkalised nickel catalyst at a pressure of 30 ata and outlet temperature 850°C. The heat input of this stage is 46100 metric ton calories per hour. From the flue gases of the furnace in which the catalyst bed is heated steam is raised at 103 ata in a waste heat boiler. The hydrogen-containing product gas (first gas - see Table 2) is cooled to 400°C in a waste heat boiler raising steam at 103 ata, then mixed with further desulphurised naphtha (9000 kg mole per hour) and steam (5000 kg mole per hour) and fed at 398°C to a reactor containing highly active nickel alumina catalyst disposed in tubes in a pressure-resistant shell filled with boiling water. Over the catalyst the carbon oxides and hydrogen of the first gas react to form methane and the naphtha reacts with steam to give methane and carbon dioxide, probably via an intermediate stage in which the naphtha and steam react to give carbon oxides and hydrogen. The total reaction is exothermic and the rate of steam production is controlled so that the temperature of the gases leaving the catalyst is 350°C. The heat evolved in this stage is 63400 metric ton calories per hour. Steam is raised at 103 ata. The composition of the produced gas - second gas, see Table 2 - is close to that required for a natural gas substitute, after making allowance for the removal of carbon dioxide. If the proportion of methane is to be higher, the product gas is cooled to 300°C and passed without carbon dioxide removal over a refractory-supported nickel methanation catalyst in an adiabatic reactor. The resulting methanated gas is subjected to carbon dioxide removal to give a natural gas substitute.

TABLE 2

|  | CO | $CO_2$ | $H_2$ | $CH_4$ |
|---|---|---|---|---|
| First gas (apart from steam) | 15.2 | 12.6 | 65.9 | 6.3 |
| Second gas (apart from steam) | 0.5 | 22.4 | 1.4 | 76.2 |
| (without $CO_2$) | 0.65 | — | 1.8 | 97.5 |
| Methanated gas (apart from steam) | under 0.1 | 22.4 | under 0.1 | 77.3 |

In each of the processes exemplified the high pressure steam generated is used as the supply of process steam after being let down through turbines. Each process is operated without imported heat.

I claim:

1. A process for producing a natural gas substitute at least partly from a hydrocarbon feedstock of higher molecular weight than methane which comprises:
   a. a first stage comprising reacting a hydrocarbon feedstock that is methane or is partly or wholly of a higher molecular weight than methane at a pressure in the range of 5–40 ata with steam in an externally heated tubular catalytic steam reforming process at an outlet temperature in the range 600°–900°C to give a first gas containing carbon oxides and hydrogen but under 30% of methane by volume on a dry basis and cooling the flue gases from the furnace of said externally heated tubular catalytic steam reforming process in a waste-heat boiler producing steam at over 1000 psig and letting down the steam in expansion engines;
   b. a second stage comprising reacting together the first gas, steam and hydrocarbon feedstock of higher molecular weight than methane at an outlet temperature of 600°–700°C over a catalyst having steam reforming and methanation activity to give a second gas, the second gas containing carbon oxides and hydrogen and having a methane content greater than that of the first gas and in the range 20–40% by volume on a dry basis and cooling the second gas in a waste-heat boiler producing steam at over 1000 psig and letting down the steam in expansion engines; and
   c. a third stage comprising reacting said second gas catalytically under methanating conditions at an outlet temperature in the range 250°–450°C in heat exchange with boiling water generating steam in which the steam generated by the said heat exchange with boiling water is at a pressure over 1000 psig and is therafter let down in expansion engines, whereby heat is continuously removed.

2. A process according to claim 1 in which the hydrogen content of the second gas is over 15%.

3. A process according to claim 1 comprising compressing the second gas and subjecting the compressed second gas to steam and carbon dioxide removal before passing it to the third stage.

4. A process according to claim 3 in which the second gas after removal of steam and carbon dioxide contains 0.3 to 4.0 volume % of steam, 2–6 volume % of of carbon dioxide and over 15 volume % of hydrogen.

5. A process according to claim 3 in which the pressure of the second gas is under 40 ata before compression and at least 68 ata after compression.

6. A process for producing a natural gas substitute at least partly from a hydrocarbon feedstock of higher molecular weight than methane which comprises:
   a. a first stage comprising reacting a hydrocarbon feedstock that is methane or is partly or wholly of a higher molecular weight than methane at a pressure in the range of 5–40 ata with steam in an externally heated tubular catalytic steam reforming process at an outlet temperature in the range 600°–900°C to give a first gas containing carbon oxides and hydrogen but under 30% of methane by volume on a dry basis and cooling the flue gases from the furnace of said externally heated tubular catalytic steam reforming process in a waste-heat boiler producing steam at over 1000 psig and letting down the steam in expansion engines;
   b. a second stage comprising reacting together the first gas, steam and hydrocarbon feedstock of higher molecular weight than methane at an outlet temperature of 600°–700°C over a catalyst having steam reforming and methanation activity to give a second gas, the second gas containing carbon oxides and hydrogen and having a methane content greater than that of the first gas and in the range 20–40% by volume on a dry basis and cooling the second gas in a waste-heat boiler producing steam at over 1000 psig and letting down the steam in expansion engines;
   c. a cooling stage in which the second gas is cooled; and then
   d. a third stage comprising catalytically reacting under methanating conditions the second gas at an outlet temperature in the range 250°–450°C in co-current heat exchange with feed gas from stage c) and cooling the gas product exiting the third stage in a waste-heat boiler producing steam at over 1000 psig and letting down the steam in expansion engines, whereby heat is continuously removed from the reacting gas and the feed gas to the third stage is warmed preparatory to entering the catalyst bed.

7. A process according to claim 6 in which the hydrogen content of the second gas is between 8 and 20%.

8. A process according to claim 6 further comprising compressing the second gas and subjecting it to steam and carbon dioxide removal before passing it to the third stage.

9. A process according to claim 8 in which the second gas after removal of steam and carbon dioxide contains 0.3 to 4.0 volume % of steam, 2–6 volume % of carbon dioxide and between 8 and 20 volume % of hydrogen.

10. A process according to claim 8 in which the pressure of the second gas is under 40 ata before compression and at least 68 ata after compression.

11. A process for producing a natural gas substitute at least partly from a hydrocarbon feedstock of higher molecular weight than methane which comprises a. a first stage comprising reacting a hydrocarbon feedstock that is methane or is partly or wholly of a higher molecular weight than methane at a pressure in the range of 5–40 ata with steam in an externally heated tubular catalytic reforming process at an outlet temperature in the range 600°–900°C to give a first gas containing carbon oxides and hydrogen but under 12% of methane by volume and cooling the flue gases from the furnace of the externally heated tubular catalytic steam reforming process in a waste-heat boiler producing steam at over 1000 psig and letting down the steam in expansion engines;

b. a second stage comprising reacting together the feed gas, steam and hydrocarbon feedstock of higher molecular weight than methane at an outlet temperature in the range 250°–450°C over a catalyst having steam reforming and methanation activity in heat exchange with boiling water generating steam in which the steam generated by the said heat exchange with boiling water is at a pressure over 1000 psig and is thereafter let down in expansion engines to produce a second gas, the second gas having a methane content of over 90% by volume on a dry $CO_2$-free basis.

12. A process according to claim 11 including further methanating the second gas in a third stage.

13. A process according to claim 11 in which the temperature at the outlet of the second stage is less than that at the inlet by between 20° and 100°C.

14. A process according to claim 11 in which the feedstock fed to the second stage is between 75 and 95% of the total hydrocarbon fed to the process.

15. A process for producing a natural gas substitute at least partly from a hydrocarbon feedstock of higher molecular weight than methane which comprises a. a first stage comprising reacting a hydrocarbon feedstock that is methane or is partly or wholly of a higher molecular weight than methane at a pressure in the range of 5–40 ata with steam in an eternally heated tubular catalytic reforming process at an outlet temperature in the range 600°–900°C to give a first gas containing carbon oxides and hydrogen but under 12% of methane by volume and cooling the flue gases from the furnace of the externally heated tubular catalytic steam reforming process in a waste-heat boiler producing steam at over 1000 psig and letting down the steam in expansion engines;

b. a cooling stage in which the first gas is cooled; and then c. a second stage comprising reacting together the first gas, steam and hydrocarbon feedstock at an outlet temperature in the range 250°–450°C over a catalyst having steam reforming and methanation activity to produce a second gas having a methane content of over 90% by volume on a dry $CO_2$-free basis, the second stage reaction being performed in co-current heat exchange with cool gas from stage b), whereby heat is continuously removed from the reacting gas and the first gas from said cooling stage is warmed preparatory to entering the catalyst bed and cooling the second gas in a waste heat boiler producing steam at over 1000 psig and letting down the steam in expansion engines.

* * * * *